United States Patent [19]

Hasegawa et al.

[11] 3,904,877

[45] Sept. 9, 1975

[54] IMAGED SHEET OR FILM AND METHOD AND APPARATUS FOR PREPARING SAME

[75] Inventors: Takanori Hasegawa; Yoshio Tsuji, both of Tokyo, Japan

[73] Assignees: Asahi-Dow Limited; Riso Kagaku Corporation, both of Tokyo, Japan

[22] Filed: Dec. 12, 1972

[21] Appl. No.: 314,477

[30] Foreign Application Priority Data

| | | |
|---|---|---|
| Dec. 28, 1971 | Japan | 46-2218 |
| Apr. 20, 1972 | Japan | 47-39922 |
| Apr. 20, 1972 | Japan | 47-47046[U] |

[52] U.S. Cl. .................... 250/317; 250/316; 264/22

[51] Int. Cl.[2] .................... G03C 5/16

[58] Field of Search ............ 96/87 R; 250/316, 317, 250/65 T; 264/22, 230

[56] References Cited

UNITED STATES PATENTS

| | | | |
|---|---|---|---|
| 3,111,584 | 11/1963 | Appeldorn | 250/319 |
| 3,675,013 | 7/1972 | Kubo et al. | 250/317 |
| 3,679,455 | 7/1972 | Kasugai et al. | 96/87 R |
| 3,705,808 | 12/1972 | Kasugai et al. | 96/87 R |
| 3,712,812 | 1/1973 | Van Paesschen et al. | 96/87 R |
| 3,737,662 | 6/1973 | Yabe et al. | 250/317 |
| 3,751,665 | 8/1973 | Yabe et al. | 250/317 |

*Primary Examiner*—Norman G. Torchin
*Assistant Examiner*—Edward C. Kimlin
*Attorney, Agent, or Firm*—Flynn & Frishauf

[57] ABSTRACT

A film or sheet of a stretched thermoplastic resin, for example, a vinylidene chloride-vinyl chloride copolymer resin, which may be supported on the same or different transparent sheet, is superposed on an original and then irradiated by light, i.e. the light with high intensity which is rich in rays of wavelength from 0.7 to 1.5 microns, for a very short time in a manner that the irradiated film or sheet, not being perforated, may be used for projection or as a second original for reproduction of diazo type copies of a certain type of original where direct diazo type copies are not obtainable.

12 Claims, 5 Drawing Figures

IMAGED SHEET OR FILM AND METHOD AND APPARATUS FOR PREPARING SAME

This invention relates to a method for forming a copied image for projection or further copying and to an apparatus for performing the method.

Hitherto, commercially available films for making projection transparencies comprised a plastics sheet coated with a photosensitive substance, e.g. silver bromide, a heat sensitive color coupler or a coarse-surface forming heat-sensitive substance. However, these are expensive and involve problems such as instability of the chemical substance, too cumbersome operational procedures before optimum copies may be procured; etc.

It has also been proposed to make use of the heat shrinkable property of a thermoplastic resin film. A manuscript having a desired image is superposed on the surface of, for example, a polystyrene sheet or a polypropylene film, followed by infrared irradiation by means of a tangsten incandescent lamp, resulting in the formation of a concavo-convex image. The image is projected by means of a projector, for example, an overhead projector, onto a screen. Plastics films or sheets commercially available for use as the transparency for this method are either unstretched, or stretched films or sheets which have been chemically treated, or films and sheets which have received heat treatment after film formation. The projected image of the thermographic transparency obtained from these films or sheets by means of a commercially available heat-sensitive copying machine (e.g. Thermofax, produced by 3M Co.) is insufficient in contrast and indistinct in image when compared with that obtained by the previously mentioned films coated with chemical substances.

Close observation of the images obtained by exposing those films to infrared irradiation shows that the concavo-convex portion formed is comparatively large so that an undesired effect of scattering of the light from the projector occurs. Furthermore, sharpness is lost around the concavo-convex image formed due to the swelling of the molten plastics films. Therefore, the concavo-convex image portion either loses flatness, or is partly perforated, or the formation of the concavo-convex image is insufficient. Accordingly, the projected image obtained is irregular and inaccurate.

Also when an unstretched film is irradiated by infrared radiation, it is necessary to use irradiation energy which is increased by 30% or more compared with the stretched one. In addition, as the irradiation is continued for a long time, the portion around the concavo-convex image becomes indistinct due to the swelling of the melted films.

Furthermore, the prior heat-sensitive copying methods have a problem in using a tungsten incandescent lamp itself, because irradiation should be conducted with light having long wave length for a long time.

BRIEF DESCRIPTION OF DRAWINGS

In the accompanying drawings

FIGS. 4*a* and 5*a* show the results of imaging by an overhead projector, while

DETAILED DESCRIPTION OF INVENTION

Figure 1:
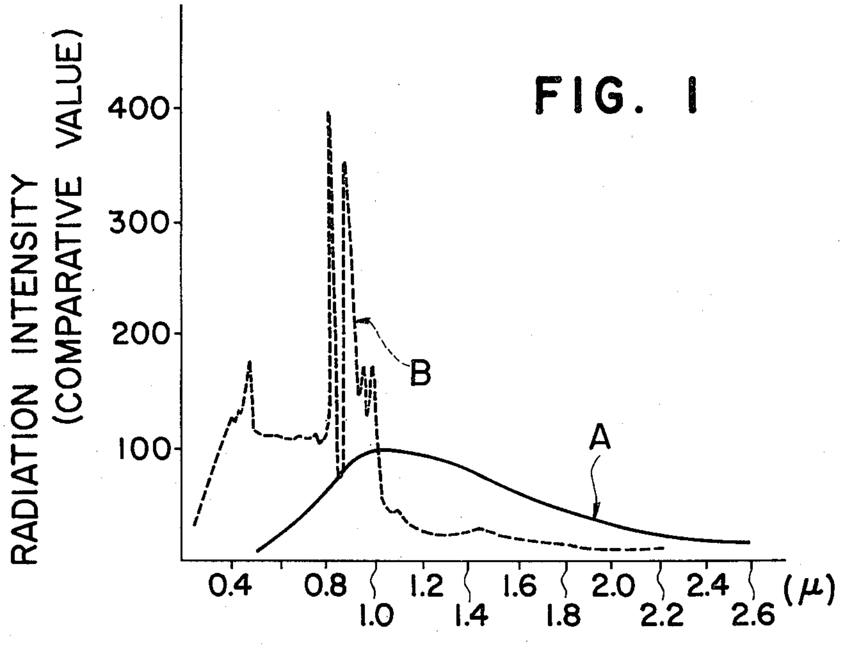
FIG. 1 shows at A a diagram of the spectral distribution of the light from a tungsten incandescent lamp.
Figure 2:
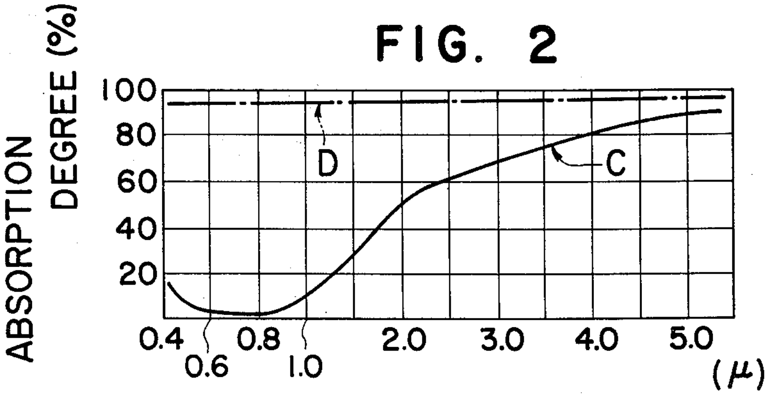
FIG. 2 shows the spectral absorption curve C of a paper generally used as a substrate for an original manuscript and the spectral absorption curve D of carbon which forms the image portion on the manuscript.

As shown in FIG. 1 at A and FIG. 2 at C the spectral distribution curve of the light from a tungsten incandescent lamp is broad and smooth and contains a large portion of wavelength of 1.5 microns or more which are easily absorbable by the paper. On prolonged irradiation, the temperature of the paper itself is raised and the heat generated there is transmitted to the film used to prepare the projection transparency, whereby the flatness of the film deteriorates and fusion of the film at the concavo-convex image is accelerated. Thus, the concavo-convex portion is undesirably swollen up to produce an indistinct image.

In order to obtain an image which is excellent in resolution, distinct and of good contrast, it is necessary to eliminate undesirable heat transmission. It is also required to suppress the light absorption at portions other than the patterns to be imaged in the original manuscript so far as possible, and to transmit the absorptive heat generated at the image portion only to the surface of the film, thereby avoiding the heat transmission to the internal portion of said film.

The present invention provides a method for preparing an imaged film or sheet for use as a projection transparency or as a second original for further copying by forming an extremely fine concavo-convex image on the surface of a stretched thermoplastic resin film by superposing the stretched film on an original manuscript and effecting flash irradiation with light of high intensity which is rich in radiation of wavelength from 0.7 to 1.5 microns. No special coating of chemical substances or conducting any pre-treatment such as heat-treatment is required.

By light rich in radiation of wavelength 0.7 to 1.5 microns we mean light in which a curve showing the spectral distribution of radiation wavelengths present in the light has at least one peak at a wavelength of from 0.7 to 1.5 microns.

The present invention also provides apparatus for preparing an imaged sheet or film comprising an electro flash discharge tube capable of producing light of high intensity and rich in radiation of wavelength from 0.7 to 1.5 microns, a transparent plate to support material for exposure to the flash discharge tube, and a keep plate superposed on the transparent plate.

In accordance with the present invention, a stretched thermo-plastic resin film is irradiated by the light with high intensity which is rich in radiation of wavelength from 0.7 to 1.5 microns for a short time, for example, about $10^{-2}$ to $10^{-4}$ seconds, thereby imparting the absorption heat generated only at the manuscript image portion only to the portion very near the surface of said film to form an extremely fine concavo-convex image thereon through heat shrinkage accompanied by softening and/or fusion. When the manuscript is an electrostatic copy such as a Xerox copy, toner particles attached to the surface of the copy are melted by the heat generated by the irradiation. Part of the melted toner is thereby attached to the film surface to form a toner image. The film thus obtained may be used as a second original film for diazo type copying.

It has also been found that, in order to obtain a distinct projected image, it is preferable to use a film having a higher degree of heat shrinkage and a thickness which is as thin as possible while still allowing a concavo-convex image to be formed. For this purpose, it is also required to avoid any overall shrinkage of the film or complete perforation thereof. This requirement may be accomplished by adhering a comparatively thin stretched thermoplastic synthetic resin film to a support sheet which is comparatively tough. It is also found that a highly sensitive heat-sensitive film for projection is obtained by laminating on one or both sides of a thermoplastic synthetic resin substrate thermoplastic synthetic resin layers of species different from the substrate to form a multi-layer sheet and stretching the sheet obtained. Furthermore, when vinylidene chloride-vinyl chloride copolymer resin films are used films of the same kind may be formed into a multi-layer sheet without being combined with other resin films having a lower degree of heat shrinkage. While the multi-layer sheet thereby obtained is substantially thick not to permit complete perforation, it has sensitivity comparable to a thin film to form a projected image which is distinct and excellent in contrast.

Each of the elements used in the present invention will now be explained in more detail.

I. The Original to be Copied

As an original to be used in the present invention, any manuscript prepared by conventional methods such as writing, printing or copying may be used. Since the concavo-convex image is formed by the heat generated in the manuscript image portion, the manuscript is required to contain in the image portion a substance which absorbs the near infrared rays of light and generates heat. Carbon black is preferred as such a substance.

II. The Films Used for the Imaging.

The thermoplastic resin films used in the present invention may include an inflation molded or a biaxially stretched film of polyvinylidene, particularly, vinylidene chloride-vinyl chloride copolymer, polyvinyl chloride, polyvinyl acetate, or polystyrene sheet. Polyolefin films such as polypropylene or polyethylene, polyethylene terephthalate films or ethylene-vinyl acetate copolymer films may also be used. A film having a softening point of 140°C or lower is preferred. Since the formation of the minute concavo-convex image is instantly accomplished by heat shrinkage accompanied by softening and/or fusion, the film needs to be stressed throughout. For this purpose, the film is preferably stretched to 2.5 times or more its original dimension in longitudinal and transverse directions. The thickness of the film is preferably from 5 to 100 microns, most preferably, from 7 to 40 microns. If a film with thickness of 5 microns or less is used as a single sheet, the film itself may be perforated or a projected image of good contrast may not be obtained. If a thickness of 100 microns or more is used as a single sheet, the projected image obtained becomes indistinct.

Alternatively, a thin film which is of low rigidity may be adhered to a transparent support or circumferentially reinforced with paper or plastics frame for convenient use. As a support of the first type, a transparent and comparatively tough sheet for example of rigid polyvinyl chloride, polystyrene, cellulose triacetate, or cellulose diacetate, may be used. Preferably, however, a plastics sheet having a lower stretching degree and/or a higher softening point as compared with the stretched thermoplastic synthetic resin film for the imaging is most suitable.

The adhesives used between the stretched thermoplastic synthetic resin film and the support film may include adhesives of an epoxy type, an isocyanate, a vinyl acetate, a vinyl chloride, an acrylic, a synthetic rubber or copolymer types thereof. It is only required that these adhesives should be transparent and have an ordinary adhesive strength.

When a vinylidene chloride-vinyl chloride copolymer (the former: 75 to 95 parts by weight, the latter: 5 to 25 parts by weight) resin film is used as the stretched film, two sheets or more may be used in multi-layers. In this case, however, since the vinylidene chloride-vinyl chloride copolymer resin film possesses self-adhesiveness, the use of adhesives is not necessarily required between these films. The films adhered are preferably equal in thickness to each other.

Furthermore, in a suitable combination of a thermoplastic resin film for image formation and a substrate resin film, the image film may be adhered to the substrate without using adhesives. As image films, polyolefins such as propylene-ethylene copolymer, chlorinated polyolefins, or vinyl type synthetic resins such as ethylene-vinyl acetate copolymer, polyvinyl chloride, polyvinyl acetate or polyvinylidene chloride may be used. As synthetic resins for the substrate film, polyvinylidene chloride, polystyrene, polyvinyl chloride, polyvinyl acetate, polyethylene terephthalate or polyolefins, such as polypropylene or polyethylene, may be used. In this method, on the one side or both sides of the substrate film which is comparatively thicker, are laminated the image films which are thinner than the substrate film. The composite is then stretched, whereby the image films are adhered to the substrate with reduced thickness to give a highly sensitive heat-sensitive film. Accordingly, the substrate film is preferably selected from those which are comparatively tough. On the other hand, the image film is selected from resin films which are excellent in compatibility or adhesiveness with the substrate film, and have a comparatively lower softening point. The thickness of the film for imaging after stretching is preferably 15 microns or less, most preferably from 5 to 10 microns.

For the preparation of the composite as mentioned above, a co-extrusion method, wherein film formation is simultaneously conducted by using two or three extruders, may be applied. Alternatively, on an unstretched substrate resin film, a film of the resin for image formation is coated in a solution or by means of an extrusion coating. Subsequently, the laminated product is stretched for example by the biaxial stretching method. Stretching is preferably effected to 2.5 times or more the original dimension, in longitudinal and transverse directions. In these methods, the films are put together without using adhesives. The two different species of synthetic resins combined should be compatible with each other. If desired, the support may be subjected to a pre-treatment such as corona discharge or a chemical treatment by polyethylene imine. The film for a projection transparency prepared by this method has a stretched thermoplastic synthetic resin film for image formation which is thinner in thickness and has a higher degree of stretching as compared with the singly stretched film. In addition, a material which is difficult to stretch singly may be formed into highly stretched films. Furthermore, in addition to these advantages, since the heat-sensitivity is extremely high, concavo-convex image formation is possible even under a low energy irradiation. Accordingly, a remarkably distinct image may be formed on the film even from a manuscript handwritten lightly in pencil or an offset printed manuscript containing a small amount of carbon. By the use of a comparatively tough resin for the substrate film, a tough composite which is convenient to handle may be obtained.

Thus, the laminated films as mentioned above do not lose flatness through overall shrinkage, and form concavo-conves images without being perforated when they are irradiated, although they contain a thin and highly heat-sensitive stretched thermoplastic resin film. They are also very tough and can be handled easily.

For the purpose of achieving a projected image with a background of various colors or adjusting the contrast, coloring agents such as dyes, pigments (either organic or inorganic), fillers such as fine particle powders, lubricants such as metal soaps or inorganic fine powders, may be added to at least one of the stretched thermoplastic synthetic resin films, adhesives and the support sheet. These materials may be added before molding the films or may be coated on the surface of the films after molding by suitable methods. Such a colored film gives an adequate contrast when projection scene is made over a short distance, and eye-fatigue is lessened. A similar effect is also attained by making the film slightly inferior in light transmittivity by admixing a suitable amount of a synthetic rubber or a different kind of thermoplastic synthetic resin, for example, ethylene-vinyl acetate copolymer, with the synthetic resin employed in the transparency.

III. Irradiation of the Stretched Film.

The light irradiation in accordance with the present invention may vary with the irradiation area and the distance from the light source and the irradiated plane. In general, the light with high intensity which is rich in radiation of wavelength from 0.7 to 1.5 microns is flash irradiated for a very short time, for example, for about $10^{-2}$ to $10^{-4}$ seconds.

The light source preferably used for such an irradiation is an electro flash discharge tube such as a xenon-filled lamp. Various combinations of anode voltage and number of discharge tubes as well as electrical condenser capacity may be selected in accordance with the size of irradiation area required.

The line B in FIG. 1 of the accompanying drawings is an example of a spectral distribution curve of light from a xenon-filled lamp. The paper, apart from the image portion, absorbs little of the light, while the amount of wavelength from 0.7 to 1.5 microns absorbable by the carbon contained in the image portion is extremely high. The light also does not contain much radiation of wavelength over 1.5 microns. Accordingly, heat transmission which leads to excessive fusion is eliminated, so that a film or sheet for projection can be obtained in an extremely short time.

Figure 3:
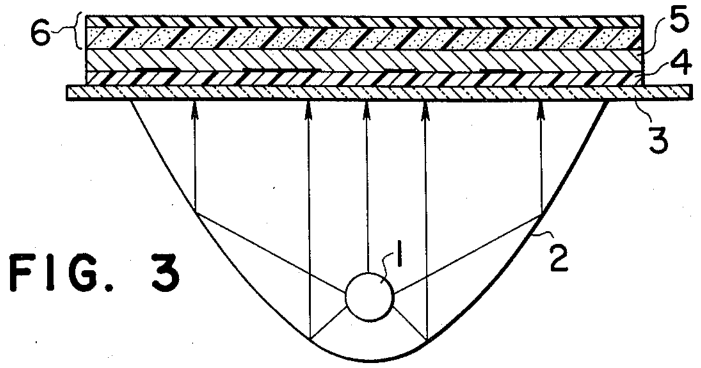
FIG. 3 depicts a preferred embodiment of an apparatus of the present invention.

A preferred embodiment of an apparatus of the present invention is shown in FIG. 3 of the accompanying drawings wherein a transparency for projection of 10 cm ×20 cm in size is prepared. An electro flash discharge tube 1 filled with xenon gas, having a distance between the electrodes of 16 cm, a diameter of 8 mm and a maximum input energy of 600 W. second, is set at the focus of a parabolic reflector 2. Upon a transparent plate 3 (2 mm soda-lime glass plate) is superposed a stretched thermoplastic resin film 4. A manuscript 5 is placed on the film 4 so that the image portion thereof may be in close contact with the film. These layers are brought under pressure by a keep plate 6. The charge accumulated in an electrolytic condenser charged at 650 V with 2400 microfarads is connected to the discharge tube and discharged by charging the tube wall at about 10,000 volts, whereby the manuscript 5 is irradiated by light with an intensity of photo-energy of 2.5 W. second per unit area ($cm^2$). By the heat generated at the image portion of the manuscript, an extremely fine concavo-convex image is formed on the film.

The above example is the most preferred embodiment of the present invention. The irradiation should be as uniform as possible on the original film or sheet. Any irradiation distance, light source (with any shape), or reflector (with any shape) may be employed.

Furthermore, flash irradiation may be effected without the use of a reflector, by setting an electro flash discharge tube at the centre portion of a glass cylinder.

The invention is further illustrated in the following Examples and by reference to FIGS. 4 and 5 of the accompanying photographs of imaged films from 8 point type manuscript.

EXAMPLE 1.

A 25 cm square sheet of vinylidene chloride-vinyl chloride copolymer (85:15 parts by weight), prepared by the inflation method and having a thickness of 40 microns, is superposed on a newspaper. An irradiation apparatus is used which is similar to that shown in FIG. 3. Two electro discharge tubes, filled at a pressure of 100 mm Hg with xenon gas and having a distance between electrodes of 25 cm and a maximum input energy of 700 W. second, are set one at each focus of a parabolic reflector with W-shaped cross section. Each tube is connected to a set of electrolytic condensers of 3200 microfarads which is charged at 630 V by a suitable rectifying circuit. The tube wall of the above discharge tube is charged to 10,000 V, whereby irradiation is effected for about $10^{-3}$ seconds. An extremely fine concavo-convex image is formed on the copolymer film. When the image on this film is projected by means of an overhead projector, a well contrasted and distinct projected image is obtained (see FIG. 4 (*a*)).

Similarly, a composite of the above film adhered by a vinyl acetate emulsion adhesive to a transparent cellulose triacetate sheet with thickness of 75 microns is irradiated, whereby an extremely fine concavo-convex image is obtained of equal quality to that of the single film.

Figure 4A:
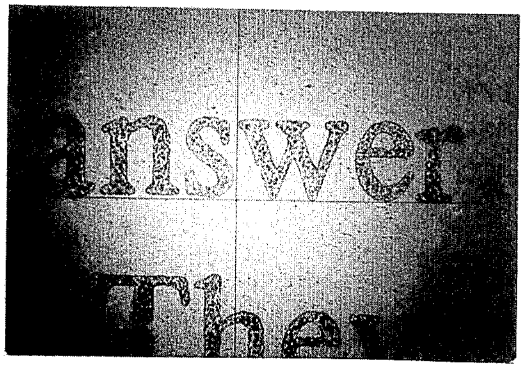
Figure 4B:
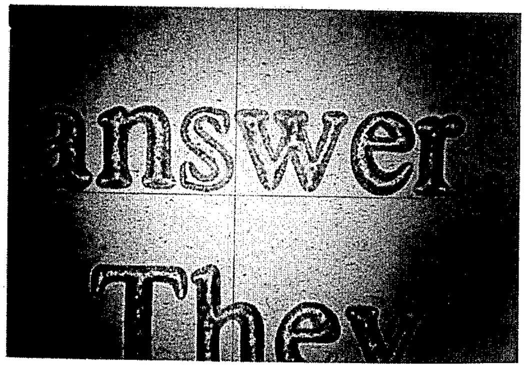
FIGS. 4*b* and 5*b* show results of irradiating the film by known heat-sensitive copying apparatus.

On the other hand, when the single film is irradiated by a known heat-sensitive copying apparatus (3M Thermofax, Model No. 45) at a speed of 6 cm/second, an image as shown in FIG. 4 (*b*) is obtained. The image shown in FIG. 4 (*a*) when compared with that of FIG. 4 (*b*) is extremely fine and of high density in the concavo-convex formation of the image portion, thereby affording a conspicuous effect of scattering the projected light. Accordingly, the projected image exhibits a remarkably distinct and excellent contrast.

EXAMPLE 2.

Example 1 is repeated, except that a single film with thickness of 15 microns, a manuscript written in pencil and a discharge tube filled at a pressure of 70 mm Hg with xenon gas are used, to obtain an extremely fine concavo-convex image on the surface of the film.

This image is projected by means of an overhead projector to obtain a well contrasted and distinct projected image.

EXAMPLE 3.

An inflation molded film of vinylidene chloride-vinyl chloride copolymer (80:20 parts by weight) resin admixed with 1 wt.% of an orange pigment and having a thickness of 30 microns, is adhered to a cellulose diacetate sheet, having a thickness of 130 microns, by using an adhesive of vinyl acetate-acrylate copolymer emulsion in an amount of 1.5 g solids per square meter. This composite is cut into a 25 cm square. Upon the copolymer film side of this sheet is superposed a newspaper cutting. Irradiation is effected similarly to Example 1 by light of high intensity and rich in rays of wavelength from 0.7 to 1.5 microns from a xenon lamp filled at a pressure of 150 mm Hg with xenon. A concavo-convex image corresponding to the newspaper cutting is formed without deterioration of flatness. When this image is projected by means of an overhead projector, a distinct and well contrasted projected image is obtained against a slightly orange background. This sheet is also tough and very convenient to handle.

EXAMPLE 4.

An inflation molded film with thickness of 20 microns of the same vinylidene chloride-vinyl chloride copolymer resin as used in Example 2 is wound on a roll carefully so as to remove as much of the air contained in the inflation molded film tube as possible, when both ends thereof are cut off to form a 2-ply vinylidene chloride-vinyl chloride copolymer resin film with thickness of 40 microns. The two layers of synthetic resin film are strongly adhered by the self-adhesiveness of the material and is not peeled off into two sheets under ordinary handling. The two-ply film is cut into a 25 cm square to prepare a film for projection. This film and a single film (one layer) with thickness of 40 microns prepared by the inflation method from the same material are both superposed on a test chart made by offset printing and subjected to flash irradiation from the same xenon lamp as used in Example 2. After the concavo-convex image is formed on each film, each image is projected by means of an overhead projector. The imaged film prepared from the two-ply film gives a projected image which is better in contrast than that from the single film.

EXAMPLE 5.

A film consisting of three layers with thickness of about 45 microns is prepared from a two-ply film with thickness of 40 microns as obtained in Example 4, but with the films adhered to each other using an admixture of 10 g of an isocyanate type adhesive with 0.5 g of a red pigment (Benzidine Red) in an amount of 5 g per square meter. This film composite is cut into a 25 cm square. Irradiation is carried out as in Example 4 to obtain a concavo-convex image. When this image is projected by means of an overhead projector, even a 0.1 mm line is distinctly projected, and the projected image obtained is in excellent contrast against the red background. This film for projection is not only tough, but also free from curling by heat since the two layers are made of the same material. Furthermore, the film can be imaged from either side.

EXAMPLE 6.

Ninety parts by weight of a vinylidene chloride-vinyl chloride copolymer admixed with additives such as plasticizers, thermal stabilizers, etc. and 10 parts by weight of an ethylene-vinyl acetate copolymer are mixed together. A synthetic resin film with thickness of 30 microns is prepared by inflation molding from this mixture. The film is cut into a 25 cm square and, a concavo-convex image is formed on the surface thereof as in Example 2. When the image is projected by means of an overhead projector, a well contrasted and distinct projected image is obtained.

EXAMPLE 7.

A biaxially stretched polypropylene film with thickness of 30 microns and an unstretched polypropylene film with thickness of 30 microns are both cut into 25 cm squares. Each sheet is irradiated as in Example 1. While hardly any image is formed on the unstretched film an extremely fine concavo-convex image is formed on the biaxially stretched film, which gives a well contrasted and distinct image on projection.

EXAMPLE 8.

A biaxially stretched rigid polyvinyl chloride sheet of 30 microns thickness is cut into 25 cm squares and irradiated according to the method described in Example 1. A concavo-convex image which is extremely fine is formed on the surface of the film. When this image is projected by means of a projector, a distinct image which is excellent in contrast is obtained.

EXAMPLE 9.

A biaxially stretched polystyrene resin sheet with a thickness of 100 microns which is cut into a 25 cm square is irradiated by the method described in Example 1. An extremely fine concavo-convex image is formed on the surface of the film (see FIG. 5 (*a*)). The projection transparency thus obtained gives a projected image which is approximately as distinct as that obtained in Example 1.

Figure 5A:
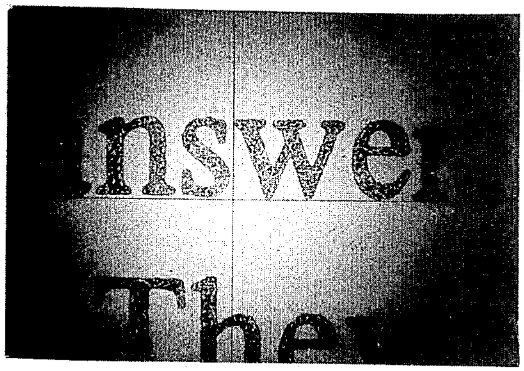
Figure 5B:
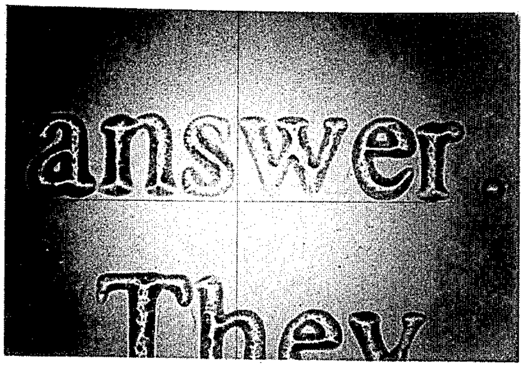

When the film is irradiated by a known heat-sensitive copying apparatus (3M Thermofax, Model No. 45), an image as shown in FIG. 5 (*b*) is obtained. FIG. 5 (*a*) when compared with FIG. 5 (*b*) is extremely fine and of high density in the concavo-convex formation of the image portion to give a projected image which is distinct and of good contrast.

EXAMPLE 10.

97 Parts by weight of polypropylene monomer and 3 parts by weight of ethylene monomer are copolymerized to prepare a propylene-ethylene copolymer, from which a film of thickness 12 microns is formed by inflation molding. This film is cut into a 25 cm square and a concavo-convex image is formed on the surface thereof according to the method described in Example 2. This image is projected by means of an overhead projector to give a well contrasted and distinct image, although the projected image is slightly darker compared with that obtained in Example 7.

EXAMPLE 11.

A piece of a biaxially stretched polystyrene resin film with a thickness of 50 microns and an area of a 25 cm square is superposed on a manuscript, which is copied from an original by means of Xerox 660 (trade name of the product of Fuji Xerox Co., Ltd.), followed by flash irradiation by means of the apparatus used in Example 1. An extremely distinct image is formed on the film. The film surface is melt adhered to the polystyrene resin contained in the toner. Upon the surface of the film is formed an extremely fine concavo-convex image through thermal shrinkage and the toner image is fixed firmly to the film surface. This film may be used as a second original film for diazo type copying. When copying is conducted by combining this film with a diazo type photo-sensitive paper, a clear diazo type copy is obtained at a high copying speed. When the second original film is projected by means of a conventional overhead projector, a distinct projected image excellent in contrast is obtained.

EXAMPLE 12.

Using a vinylidene chloride-vinyl chloride copolymer resin (the former: 85 parts by weight, the latter: 15 parts by weight) and an ethylene-vinyl acetate copolymer resin is prepared, by a co-extrusion inflation method, a double-layered film in which the thickness of the former resin is 25 microns and that of the latter resin is 7 microns. A thin film of 10 microns or less is difficult to obtain from an ethylene-vinyl acetate copolymer resin alone. The extent of stretching attainable with the ethylene-vinyl acetate copolymer alone is at most 2 to 2.5 times, either longitudinally or transversely, whilst that obtained by the present method is co-stretched with the vinylidene chloride-vinyl chloride copolymer resin film to as much as 4 times in either direction. The double-layered film is cut into a 25 cm square and on the side of the ethylene-vinyl acetate copolymer film, there is attached a manuscript image portion obtained by offset printing. Flash irradiation is effected from that side of the aforesaid film by means of the same flash irradiation apparatus used in Example 1. An extremely fine concavo-convex image is formed on the surface of the film. When this image is projected by means of an overhead projector, a well contrasted and distinct projected image is obtained.

EXAMPLE 13.

Using the same vinylidene chloride-vinyl chloride copolymer resin as used in Example 12 and an ethylene-vinyl acetate copolymer resin a triple layered sheet is prepared by a co-extrusion-tenter method with stretching to 2.5 times in the longitudinal and transverse directions, respectively; comprising the vinylidene chloride-vinyl chloride copolymer layer of thickness of 30 microns and on both sides thereof ethylene-vinyl acetate copolymer layers, each with a thickness of 5 microns. This sheet is imaged as described in Example 12. The image formed is projected by means of an overhead projector to obtain a well contrasted and distinct projected image similar to that in Example 12. The composite film thus obtained can be imaged from either side, because both sides of the film is capable of forming concavo-convex image. This feature contributes greatly to handling ease both as a projection transparency and as a second original for the purpose of diazo type copy reproduction.

What we claim is:

1. A method of preparing an imaged sheet or film for projection, comprising superposing an image-bearing original upon a stretched thermoplastic resin film or sheet, said original image comprising a substance which absorbs light of a wavelength of from 0.7 to 1.5 microns and which releases heat of absorption at said wavelengths, and effecting flash irradiation of said resin film and said original with high intensity light having a high radiation intensity in the range of from 0.7 to 1.5 microns and a substantially lower radiation intensity outside of said range, said irradiation being effected for a time interval only of from about $10^{-4}$ to about $10^{-2}$ second, whereupon said radiation is absorbed by said original image and absorbtive heat is generated thereat, and said absorptive heat, in turn, effects shrinkage of corresponding portions of said film which are opposed to said original image to form a concavo-convex image on said film.

2. A method of claim 1 wherein said substance is carbon.

3. A method according to claim 1 wherein the film or sheet is a multilayer film or sheet.

4. A method according to claim 3 wherein the film or sheet is that of at least two layers of stretched vinylidene chloride-vinyl chloride copolymer.

5. A method according to claim 3 wherein the multilayer film or sheet comprises a stretched film or sheet and a substrate film or sheet.

6. A method according to claim 3 wherein at least two film or sheet forming materials are laminated together before stretching.

7. A method according to claim 6 wherein the multilayer film or sheet is composed of an ethylene-vinyl acetate copolymer and a vinylidene chloride-vinyl chloride copolymer.

8. A method according to claim 1 wherein the stretched film or sheet is a single layer of a vinylidene chloride-vinyl chloride copolymer, polyvinyl chloride, polystyrene or a polyolefine.

9. A method according to claim 1 wherein the stretched film or sheet is biaxially stretched by at least 2.5 times in each direction.

10. A method according to claim 1 wherein the flash irradiation is by means of a xenon-filled discharge tube.

11. A method according to claim 1 wherein the image-bearing original is an electro-photographic copy.

12. A method according to claim 1 wherein said irradiation is so effected through said film.

* * * * *

UNITED STATES PATENT AND TRADEMARK OFFICE

CERTIFICATE OF CORRECTION

PATENT NO. : 3,904,877

DATED : September 9, 1975

INVENTOR(S) : TAKANORI HASEGAWAet al

It is certified that error appears in the above-identified patent and that said Letters Patent are hereby corrected as shown below:

Column 1, line 21: replace "tangsten" with --- tungsten ---.

Column 1, line 27: replace "stretched" with -- unstretched -- .

Column 10, line 26: replace "absorbtive" with

--- absorptive ---.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*